April 26, 1938. H. H. J. KRUSE 2,115,635
APPARATUS FOR THE MANUFACTURE OF FOLDING BOX BLANKS
Filed Feb. 2, 1937 9 Sheets-Sheet 4

INVENTOR
HERMANN H. J. KRUSE
By Norris & Bateman
ATTORNEYS

April 26, 1938. H. H. J. KRUSE 2,115,635
APPARATUS FOR THE MANUFACTURE OF FOLDING BOX BLANKS
Filed Feb. 2, 1937 9 Sheets-Sheet 6

INVENTOR
HERMANN H. J. KRUSE
By Morris & Bateman
ATTORNEYS

April 26, 1938. H. H. J. KRUSE 2,115,635
APPARATUS FOR THE MANUFACTURE OF FOLDING BOX BLANKS
Filed Feb. 2, 1937 9 Sheets-Sheet 8

INVENTOR
HERMANN H. J. KRUSE
By Norris & Bateman
ATTORNEYS

April 26, 1938.   H. H. J. KRUSE   2,115,635
APPARATUS FOR THE MANUFACTURE OF FOLDING BOX BLANKS
Filed Feb. 2, 1937   9 Sheets-Sheet 9

INVENTOR
HERMANN H. J. KRUSE
By Norris & Bateman
ATTORNEYS

Patented Apr. 26, 1938

2,115,635

UNITED STATES PATENT OFFICE 2,115,635

APPARATUS FOR THE MANUFACTURE OF FOLDING-BOX BLANKS

Hermann Hans Johannes Kruse, Bremen, Germany, assignor to No-Nail Cases Proprietary Limited, London, England, a limited liability company of Victoria, Australia Application February 2, 1937, Serial No. 123,670
In Great Britain February 7, 1936

24 Claims. (Cl. 1—12)

The present invention relates to apparatus for the manufacture of folding blanks for boxes of the kind including a plurality of panels, for example four, which form the lid, back, bottom and front of a rectangular box, the panels being held together by two metal strips each of which has a flange standing at right angles along one edge of the flat main portion of the strip and a row of teeth standing up from the flat main portion at or near the unflanged edge thereof.

In assembling a box blank of this kind, the several panels are arranged in a row and a pair of strips are placed along the opposite edges of the row of panels with their flanged edges turned outwards. The panels are next pressed against the strips so that the teeth are driven into the panels, at such a distance from the panel edges that a narrow groove is left between the flange of each strip and the panel edges adjacent thereto. The flat box blank formed in this way is folded into box form by bending the strips between adjacent panels (the flanges being notched to facilitate this bending) and end panels of the box are slipped into said grooves.

It has been proposed to assemble such folding box-blanks by means of a press which forces the strip teeth simultaneously into a pair of panels at a time, but it has been found that, owing to variations, which are unavoidable with commercial timber, in the thickness of the panels, and even in the thickness within the length of a single panel, a pressing operation alone will not enable the main portion of the strip to be secured in close contact throughout its length with the panel surfaces. If the strip is not closely secured to the panels, the container is dangerous to handle and easily damaged in use.

It is known that a method of assembling such folding box-blanks, which is satisfactory in some circumstances, is to drive the strip teeth into the panels by feeding the strip and panels together between co-operating loaded rollers which are capable of adjusting themselves to irregularities in the thickness of the panels and which can be arranged to exert a high local pressure.

It has been found however, that when thin and flexible panels, such as plywood, are employed, their deformation in front of the rollers in sufficient to distort the strip teeth slightly as they come close to the rollers but before their points have penetrated a panel; and it sometimes happens that a tooth so distorted strikes a hard spot in the panel and crumples under the rollers instead of going cleanly into the panel.

Objects of the present invention are to provide an improved method of and improved apparatus for assembling such blanks.

The method of assembling such blanks according to the present invention, comprises the steps of bringing a set of panels for one box blank into register with a pair of the toothed strips, forcing the panels so registered and while stationary into preliminary engagement with the strip teeth by means of a pressing operation by which all the teeth intended to be driven into any one panel edge are driven simultaneously, and thereafter driving the strip teeth fully home into the panels by passing the blank thus partly assembled between loaded rollers. The projecting points of the teeth are finally clenched in known manner.

The improved apparatus for assembling such blanks comprises feeding mechanism adapted to bring a set of panels for one box blank into predetermined register with a pair of the toothed strips, a press adapted to force the panels so registered into preliminary engagement with the strip teeth, all the teeth intended to be driven into at least any one panel edge being driven simultaneously, and co-operating loaded rollers adapted to receive the partly finished blank on its ejection from said press and to subject the blank to a rolling operation which drives the teeth fully home.

In order to secure a high output, it is desirable that all the panels for one box blank shall be pressed simultaneously on to a pair of strips, and, as it is convenient to feed severed lengths of strips into the box blank making machine, strip-feeding rollers of the usual kind cannot be employed to feed the strips under the beams of the press, since the length of these beams is not substantially less than the length of a strip and such rollers would obstruct the closing of the press. Consequently, a further feature of the present invention is the provision of conveying means for feeding separate lengths of strip into a predetermined position under one of the press beams, comprising a chain conveyor which is provided with a clip adapted to engage one end of the strip, and the links of which carry, or have the form of, bearing blocks, the chains or the blocks being slidable in guideways formed in the frame of the apparatus and thus being adapted to transmit to the frame the force due to the closing of the press beam on to a box blank.

The improved apparatus preferably comprises a stop movable into such a position that it is adapted to engage the leading end of a strip, as the strip attains its predetermined position or substantially that position under the press beam, but to lie out of the path of said clip, a tripping member being provided which co-operates with said clip to release the strip as its leading end contacts with said stop. Means may be provided for imparting to said stop, after it has arrested a strip, a displacement which serves to move the strip backwards into an exactly predetermined position. Thus the stop may be slidably mounted in the press beam and be adapted to move in the same direction as the press beam but independently of said beam, a catch being provided for holding said stop in such a position relative to the beam that it is inoperative when the beam is raised. This catch may be associated with a releasing member adapted to be operated by a partly finished box blank as it passes from the press to the rollers.

A further feature of the invention is the provision of an electro-magnetic control device for the press, which is normally open, this device being adapted, when energized, to cause the press to execute only one complete pressing cycle at a time, said electro-magnetic device being associated with electrical contacts actuated by the strip-feeding and panel-feeding means in such a manner that the completion of the feeding operations causes the press to operate.

The said chain conveyor is preferably provided with a plurality of strip-engaging clips, spaced apart at equal intervals, said conveyor being driven through a clutch which is associated with control mechanism arranged to disengage said clutch and to arrest said conveyor whenever any of said clips arrives at the entry end of the upper run of said conveyor.

One example of the improved apparatus is shown in the accompanying drawings in which:—

Figs. 1 and 1a together constitute a plan, with certain parts of the press-beam and strip-conveyor driving mechanism broken away. Fig. 1 corresponding to the left-hand part of Fig. 4, and Fig. 1a to the right-hand part.

Fig. 8 is a sectional side elevation of the press-beam driving mechanism, taken on the line 8—8 in Fig. 1 and including a portion omitted from Figs. 1 and 4.

Fig. 10 is a sectional end elevation of a detail, taken on the line 10—10 in Fig. 1a.

Figs. 11 and 12 are respectively an end elevation and a plan of a spring-clip link of the conveyor chains, Fig. 13 is a section on the line 13—13 in Fig. 11, Fig. 17 is a sectional elevation of the strip-conveyor drive clutch, taken on the line 17—17 in Fig. 18, Figs. 18 and 19 are respectively sections on the lines 18—18 and 19—19 of Fig. 17.

The frame of the machine, as shown in Figs. 1 to 4, includes a bed-plate 30 having fixed thereon a longitudinal member 31. A second longitudinal member 31a is disposed parallel to the member 31 and is slidable transversely by means of a plurality of screws 32 engaging in screw-threaded holes in the member 31a and having their ends journalled in the member 31 and in a fixed upright member 33.

Each of the members 31 and 31a is provided with a pair of upwardly-extending horizontal flanges 34, and each flange 34 supports the upper run of an endless roller chain 35 (Figs. 14 and 15) carried on a driving sprocket 36 and a return sprocket 37. The driving sprockets 36 are keyed to a shaft 38, while the return sprockets are mounted on an idler shaft 39.

Figures 11, 12, 13, 17, 18, 19:
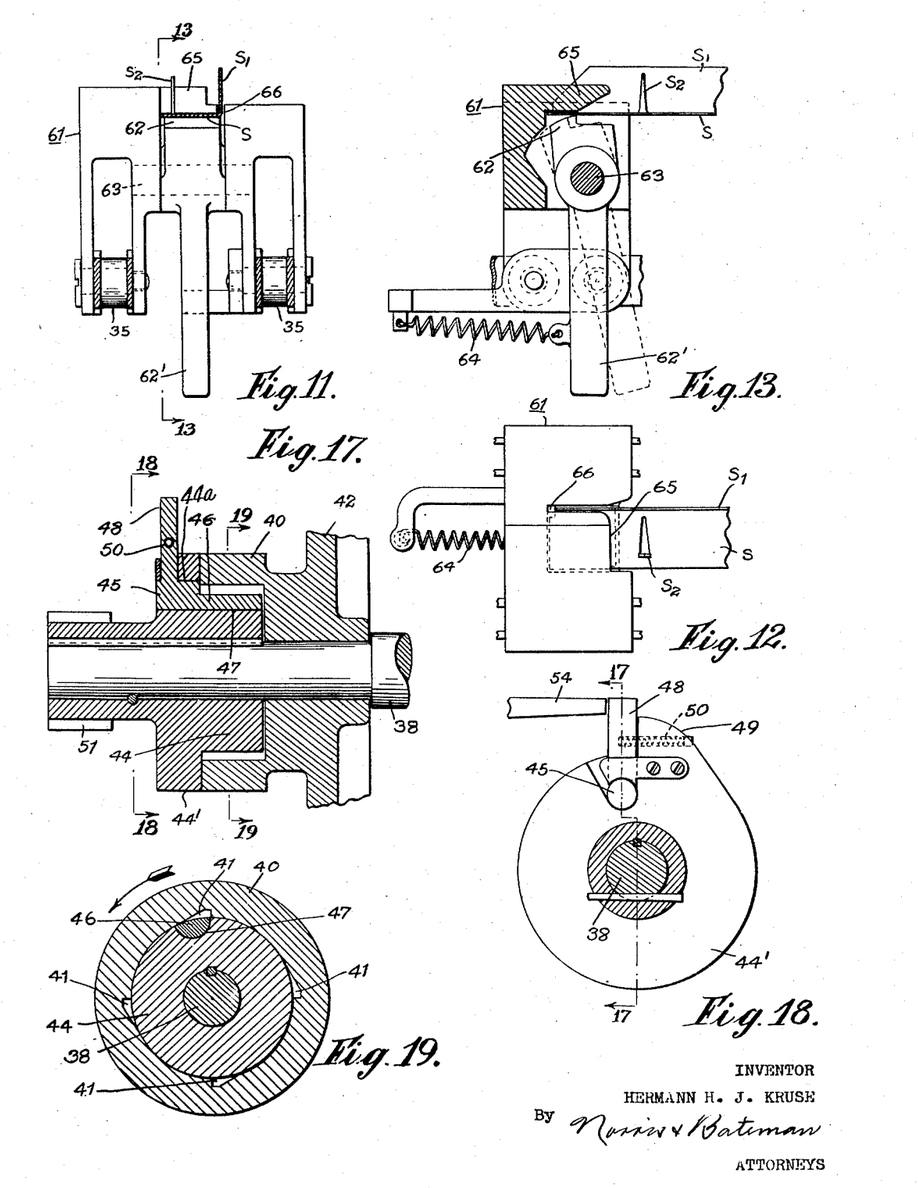

The shaft 38 is driven by gearing which is shown in Figs. 6, 7, 17, 18 and 19 and which includes a positive clutch C1 of the kind that can be tripped into and out of engagement at a particular angular position of the driven element thereof. The clutch driving part includes a drum 40 journalled on the shaft 38 and fixed to a gear wheel 42 which meshes with a pinion 43 keyed to the shaft of a continuously running driving motor (not shown). The drum 40, which rotates in the direction of the arrow in Fig. 19, is provided on its inner surface with a plurality of keyways 41 of wedge section, the deep edges of which trail. The clutch driven part includes a cylinder 44 keyed to the shaft 38 and fitted freely within the driving drum 40. A rocking key 45 is journalled at 44a in a flange portion 44' of the driven element and is provided with a projection 46 of semicircular section, which, when the clutch is disengaged, is accommodated in a keyway 47 of semicircular section, which is formed in the cylindrical part 44. The key 45 is provided with a radial lever 48 which, when the clutch is disengaged, abuts against a projection 49 on the flange 44'. A compression spring 50 urges the lever 48 away from the projection 49.

A pinion 51, integral with the driven element 44, meshes with a gear wheel 52 (Figs. 6 and 7), the parts 51 and 52 forming a 4 to 1 speed-reducing gear. The gear wheel 52 is directly connected to a cam 53, these two parts being mounted on an idler shaft 55. The cam 53 has a notch 53' adapted to receive a projection 54' on a strut 54 which is pivoted on a fixed pin 56. When the projection 54' is in the cam notch 53', the free end of the strut 54 lies in the path of the clutch key lever 48. A solenoid 57 is coupled by a link 58 to the strut 54 and serves, when energized, to raise this strut clear of the path of the clutch key lever 48.

The conveyor sprockets 36, (Fig. 4) are of such a size that the driven element of the clutch C1 makes eight revolutions while a link of the conveyor chains 35 makes a complete circuit and returns to its initial position.

Figure 4:
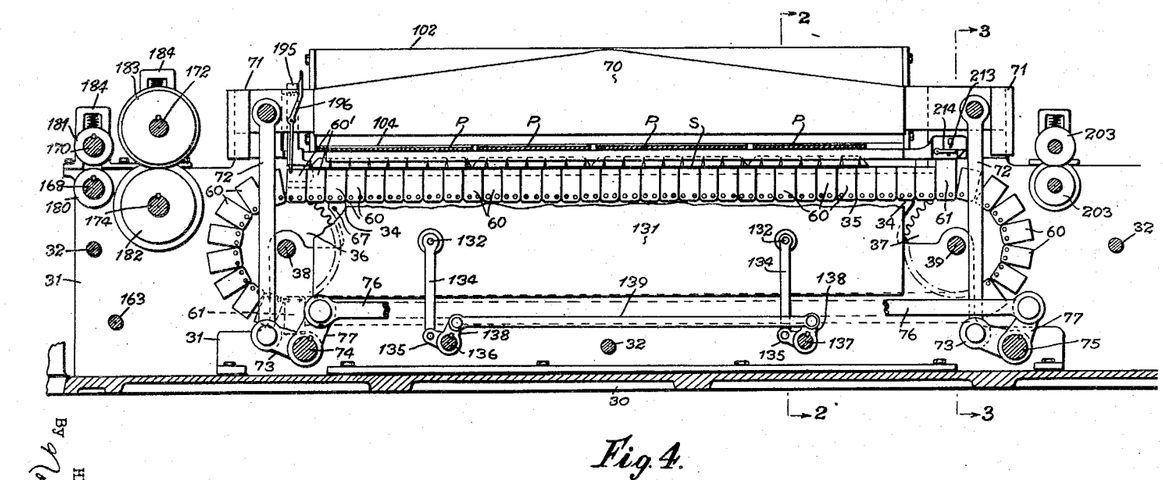
Fig. 4 is a sectional side elevation on the lines 4—4 in Figs. 2 and 3.
Figure 20:
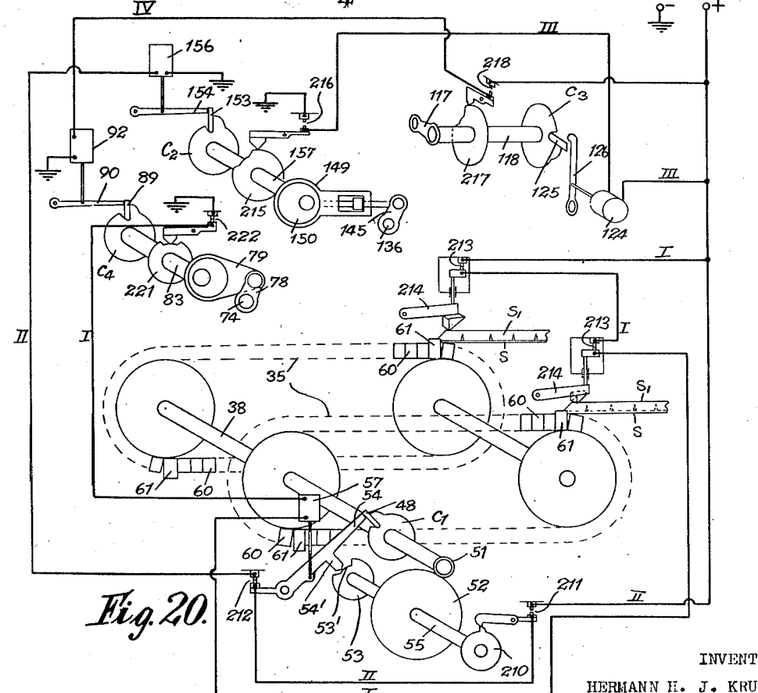
Fig. 20 is an electrical circuit diagram showing certain contactors omitted from the preceding figures for the sake of clearness.

The length of each flange 34 of the longitudinal frame members is not less than that of the longest box blank to be made. Attached to the links of each pair of chains 35 are two continuous series of bearing blocks 60, 60'. The two series are separated by two spring clips 61 spaced at equal intervals (Figs. 4 and 20). The clips on the two conveyors are level with each other in a transverse direction. When the driven member of the clutch C1 is arrested, a clip 61 is at the entry end of the upper run of the conveyors, as shown in Fig. 4.

The clips 61, which are shown to a large scale in Figs. 11 to 13, are adapted automatically to grip the leading end of a box-binding strip S as soon as the strip end enters the clip. The clip includes a lever 62 pivotally mounted on a pin 63 and urged in a trailing direction by a spring 64 acting on a projection 62'. When a strip S enters the clip, its leading end displaces the lever into the dotted position (Fig. 13) and then slips between the top of the lever 62 and a projecting portion 65 of the body of the clip, the flange S1 of the strip entering a slot 66. The spring 64 thereafter returns the lever 62 to the position shown in full lines, in which the strip is firmly gripped by a wedging action between the parts 62 and 65. The lever projections 62' depend between the frame flanges 34 as the spring clips move along the upper runs of the conveyors.

A tripping pin 67 (Figs. 14 and 15) is fixed between each pair of flanges 34 just in front of the place where the leading end of the strip is to be arrested. When the projection 62' strikes the pin 67, the lever 62 is rocked through the position shown dotted in Fig. 13 so as to release the strip, which is arrested and finally located in a manner to be described later. After the clip 61 has passed the pin 67, the spring 64 returns the lever 62 to its initial position, so that the clip is ready to engage another strip automatically, on its return to the entry end of the upper run of the conveyors.

Press beams 70 and 70a (Figs. 1 to 4), capable of being raised and lowered in guides 71, are disposed above and parallel to the frame members 31 and 31a respectively. These beams are operated in unison by two pairs of connecting-rods 72 actuated by cranks 73 keyed in pairs to rocking shafts 74 and 75 respectively. These rocking shafts are coupled together by a coupling rod 76 connecting cranks 77.

Figures 8, 10:
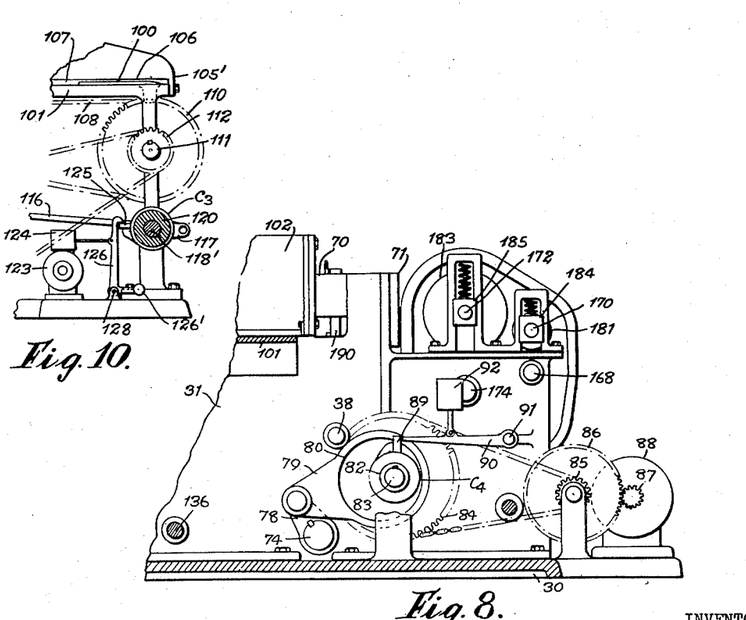

A crank 78 is fixed to the rocking shaft 74 (Figs. 1 and 3) and is coupled by an excentric-link 79 to an excentric 80 which is keyed to the driven element 81 (Fig. 1) of a positive clutch C4, the driving element 82 of which is keyed to a shaft 83 on which the element 81 is journalled. The shaft 83 is continuously rotated by an electric motor 88 (Fig. 8) through a spur gear 87, 86 and a chain gear 85, 84. The clutch C4 is similar in principle to the clutch C1 described with reference to Figs. 17 to 19, and it includes a radial key lever 89 co-operating with a strut 90 pivoted on a fixed pin 91 and capable of being raised by a solenoid 92 clear of the path of the key lever 89.

Figure 1:
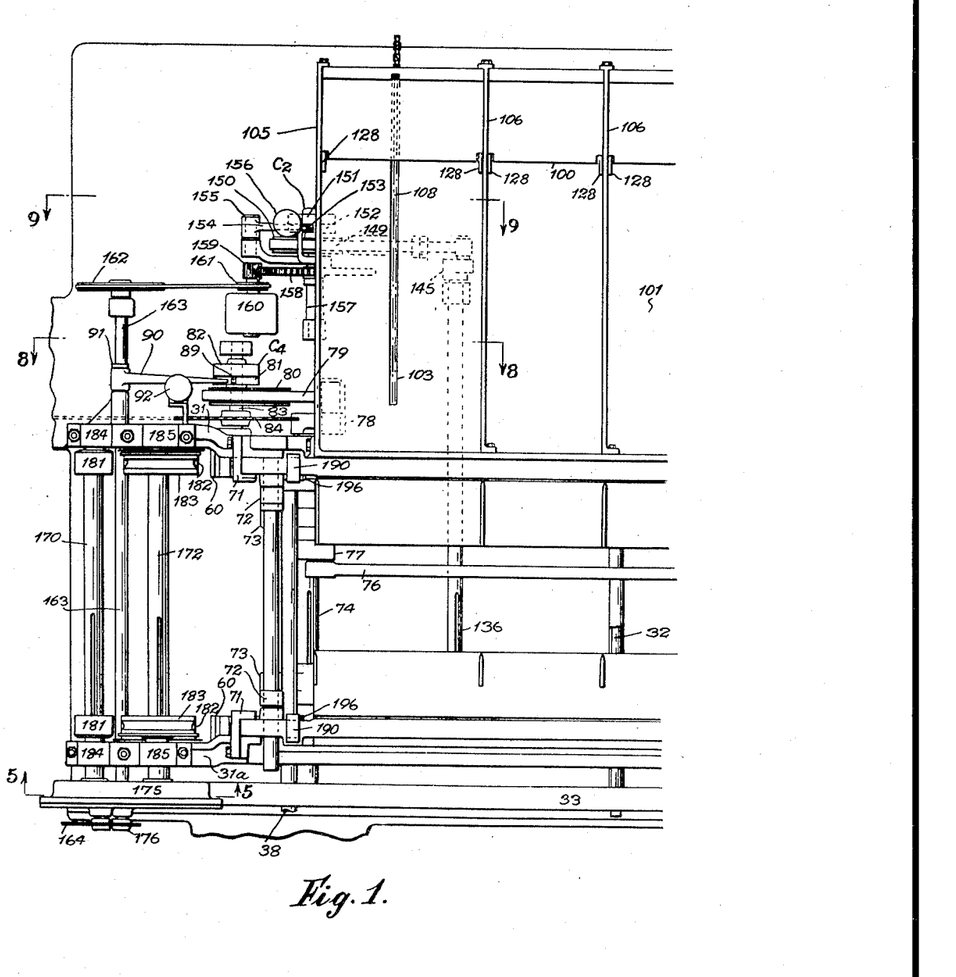
Figure 1A:
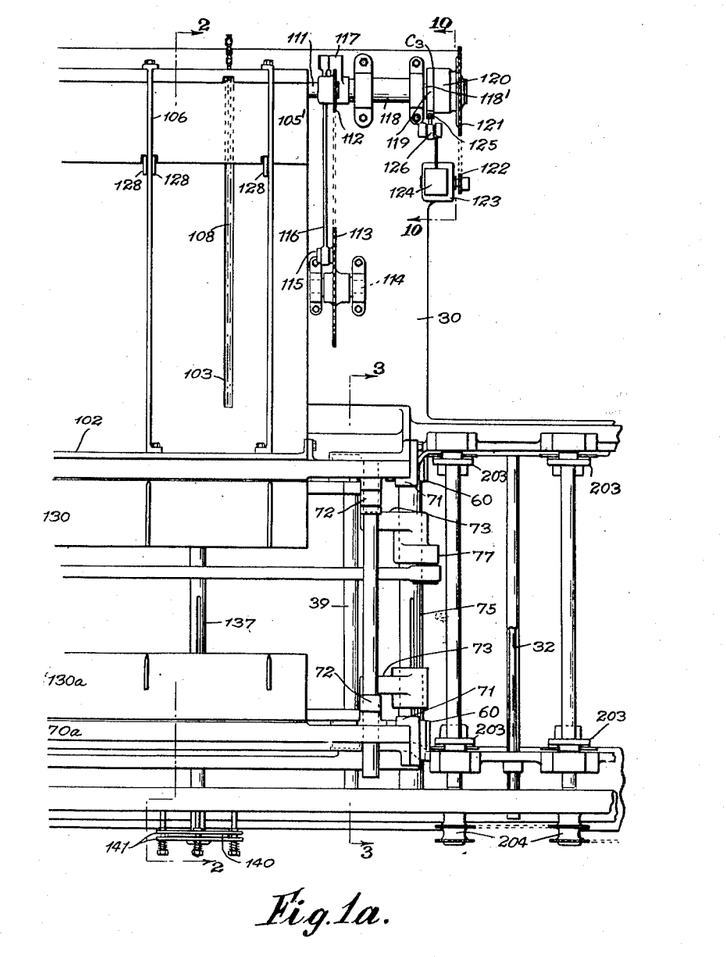
Figure 2:
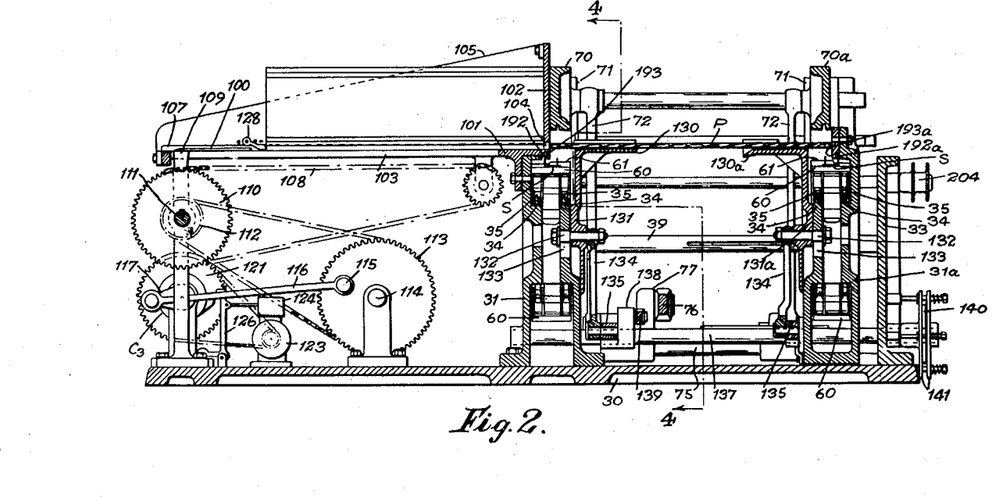
Figs. 2 and 3 are sectional end elevations on the lines 2—2 and 3—3 respectively of Figs. 1a and 4.
Figure 3:
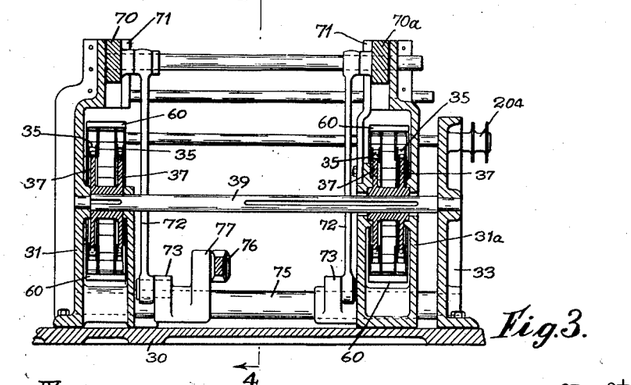

The box panels are stacked in a row of hoppers placed alongside and parallel to the frame member 31, as shown in Fig. 2. The stacks of panels are omitted from Fig. 1. The hoppers have a common floor 101 provided with two slots 103 and a common front wall 102 the lower edge of which is raised from the floor so as to leave a gap 104 the depth of which slightly exceeds the thickness of a box-panel. The four individual hoppers are formed between end walls 105, 105' and division walls 106, a shallow gap 107 being left between the bottom edges of the walls 105' and 106 and the floor 101. Pawls 128 are pivotally attached to the hopper walls at such a position that they engage behind the lowest panel of each stack. A flat feed plate 100, extending the full length of the row of hoppers, is adapted to be slid to and fro transversely across the hopper floor by a pair of endless chains 108, the upper runs of which lie under the floor. The feed plate is connected to each chain by a lug 109 sliding in the adjacent slot 103. The chains 108 are actuated by sprockets 110 keyed to an oscillating shaft 111 which is actuated by chain gearing 112, 113. The sprocket 113, which is mounted on an idler shaft 114, carries a crank-pin 115 which is coupled by a connecting-rod 116 to a crank 117, the effective radius of which is shorter than that of the crank 113, 115. The crank 117 is keyed to a shaft 118 (Fig. 1) to which is fixed the driven element 119 of a positive clutch C3. The driving element 120 of this clutch is journalled on a reduced portion 118' of the shaft 118 (Fig. 10) and is fixed to a sprocket 121 (Fig. 1) coupled by a chain to a sprocket 122 of a continuously running motor 123. The clutch C3, which is also similar in principle to the clutch C1, includes a radial key lever 125 co-operating with a hook lever 126 pivoted on a fixed pin 128 and capable of being drawn by a solenoid 124 clear of the path of the lever 125. The hook lever 126 is provided with a biasing weight 126' which urges the hook lever into position to engage the clutch lever 125.

A table, capable of being raised and lowered, is disposed between the frame members 31 and 31a and when in its raised position supports the box panels while they are being fed from the hoppers under the press beams 70 and 70a. The table (Figs. 1, 2 and 4) is in two parts 130 and 130a, having depending flanges 131 and 131a slidably fitted against the frame members 31 and 31a. The tables are guided by bolts 132 passing through vertical slots 133 in the frame members and serving as pivotal connections for connecting-rods 134 actuated by two pairs of cranks 135 fixed respectively on rocking shafts 136 and 137 constrained to rock in unison by a coupling rod 139 and cranks 138. On one end of the shaft 137 is mounted a brake comprising a disk 140 keyed to the shaft 137 and nipped between two spring-loaded rings 141 which are not rotatable.

Figure 9:
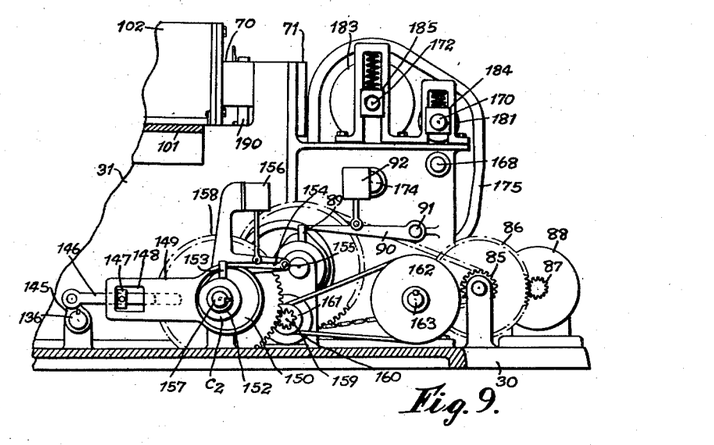
Fig. 9 is a sectional side elevation taken on the line 9—9 in Fig. 1.

The table actuating mechanism (Figs. 1 and 9) includes a crank 145 keyed to the rocking shaft 136 and actuated by an excentric-rod 146, slidably fitted in an excentric-link 149 engaged with an excentric 150. A collar 147, pinned to the rod 146, is accommodated in an aperture 148 in the link 149; the backlash thereby permitted between the parts 146 and 149 being equal to the stroke of the excentric 150 which is keyed to the driven element 152 (Fig. 1) of a positive clutch C2, similar in principle to the clutch C1. The driving element 151 of the clutch C2 is fixed to a shaft 157 to which is keyed a spur wheel 158 meshing with a pinion 159 on the shaft of a continuously running motor 160. The clutch C2 is provided with a radial key lever 153 adapted to be engaged by a strut 154 which is pivoted on a fixed pin 155. A solenoid 156, when energized, lifts the strut 154 out of the path of the lever 153.

Figure 5:
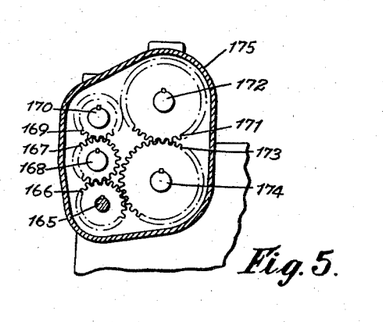
Fig. 5 is a section of a detail on the line 5—5 in Fig. 1.
Figure 6:
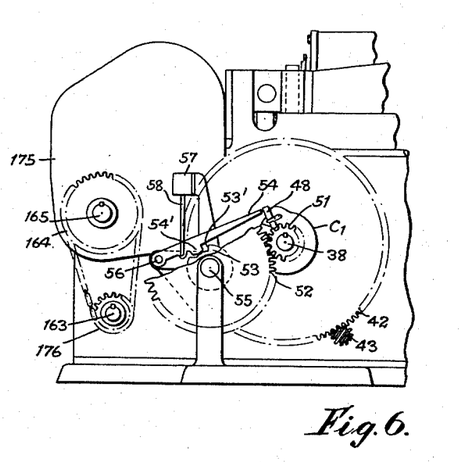
Fig. 6 is a side elevation of the strip-conveyor drive mechanism, which is omitted from the bottom left-hand corner of Fig. 1.
Figure 7:
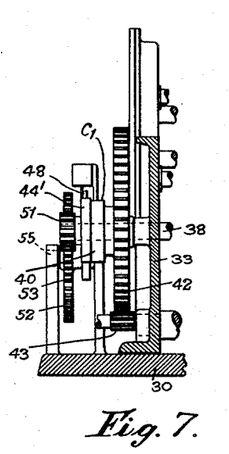
Fig. 7 is a sectional end elevation, viewed from the right of Fig. 6.

The motor 160 also drives a V-belt pulley 161 coupled by belt to a pulley 162 keyed to a shaft 163. This shaft is connected by chain gearing 176, 164 (Fig. 6) to a shaft 165 journalled in a gear casing 175 (Fig. 5). A spur wheel 166 is keyed to the shaft 165 and meshes with wheels 167 and 173 keyed respectively to shafts 168 and 174 on which are keyed respectively two lower clenching rollers 180 and two lower rolling-in rollers 182, as indicated in Figs. 1 and 4. These rollers co-operate with upper clenching rollers 181 and upper rolling-in rollers 183 which are keyed respectively to shafts 170 and 172 supported in spring-loaded bearings 184 and 185 so arranged as to urge the upper of each co-operating pair of rollers towards the lower. Fixed to the shafts 170 and 172 (Fig. 5) are gear wheels 169 and 171 meshing respectively with the wheels 167 and 173. The upper rolling-in rollers 183 are circumferentially grooved in way of the strip teeth, as is seen in Fig. 1.

Figures 14, 15, 16, 21:
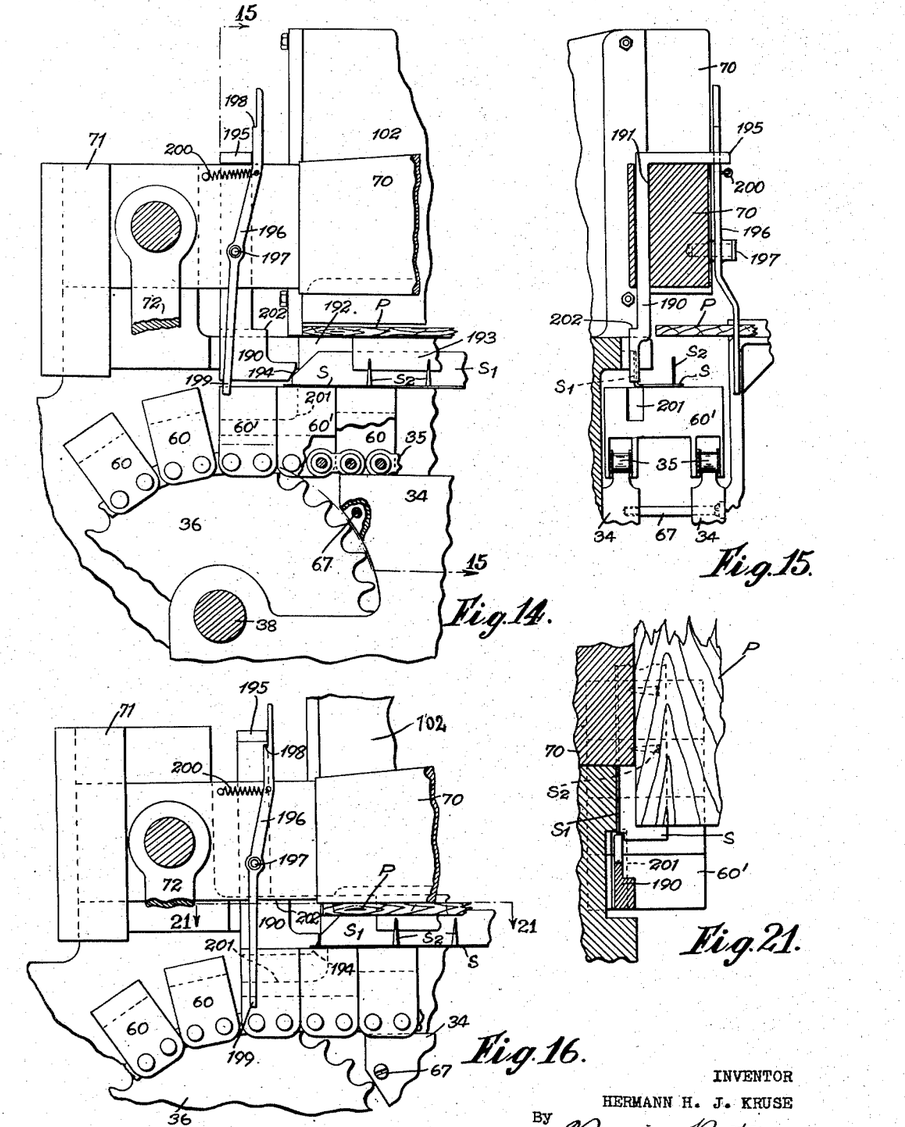
Fig. 14 is a view, to a larger scale, of a part of Fig. 4.
Fig. 15 is a section on the line 15—15 of Fig. 14.
Fig. 16 is similar to Fig. 14, except that parts are in a different configuration.
Fig. 21 is a sectional plan view of a detail of Fig. 16, taken on the line 21—21 in Fig. 16.

Each of the press beams 70 and 70a carries a movable stop which has the form of a bolt 190 slidable in a vertical slot 191 in the end of the beam nearer the rolling-in rollers (Figs. 14 and 15). The bottom of this bolt is parallel with the upper surface of the conveyor blocks 60 and is in alignment with the flange S1 of the boxbinding strip as the latter is drawn under the beam by the spring clip. The outer faces of the flanges of the strips abut against facings 192 and 192a formed on the frame members 31 and 31a (Fig. 2), while the inner faces of these flanges abut against depending guide flanges 193 and 193a respectively, whereby the strips are maintained in the desired transverse location. The bottom corner of each bolt (Fig. 14) facing the direction of approach of the strip, is bevelled as indicated at 194. The upper end of each bolt is provided with a lateral lug 195 which prevents the bolt from dropping through the beam. A two-armed lever 196 is pivoted on a pin 197 on each beam. The upper arm of each lever is provided with a notch 198 adapted to engage under the lug 195, under the influence of a spring 200, and thus hold the bolt raised in the beam. The lower arm 199 depends in the path of the partly finished box blanks as they leave the press. The foot of each bolt 190 is provided with an abutment 202 adapted to be engaged by the under surface of the beam. The two conveyor blocks 60' that lie under each bolt 190 when the conveyors are arrested are provided with recesses 201 for receiving the feet of the bolt.

Continuously running friction rollers 203 (Figs. 1 and 4) driven by chain gearing 204, serve to feed the box-binding strips into the machine.

In Fig. 20 are shown certain electrical contactors and cams which have been omitted from the other figures for the sake of clearness. Thus the cam-shaft 55 controlling the chain conveyor clutch C1 carries a cam 210 which opens contacts 211 shortly after the strut 54 moves into position to trip the clutch out of engagement. This strut is arranged to close contacts 212 only when it is in the said position. A pair of levers 214 (one of which appears in Fig. 4) are arranged to be raised by the strips S as they enter the spring clips 61 and in consequence close two pairs of contacts 213. The driven shaft 157 of the table drive clutch C2 carries a cam 215 arranged momentarily to close contacts 216 just before this clutch is tripped out of engagement. Similarly the driven shaft 118 of the panel feed clutch C3 carries a cam 217 arranged momentarily to close contacts 218 just before this clutch is tripped out of engagement. The driven shaft 83 of the beam drive clutch C4 carries a cam 221 arranged to close contacts 222 only when the beams are in their fully raised position.

The apparatus operates as follows. It is assumed that the clutches C1, C2, C3 and C4 are disengaged, that the several motors are running and that the table 130, 130a is lowered. The beams 70 and 70a will thus be raised, the panel feed plate 100 will be in the outer position as shown in Figs. 1 and 2, and a pair of conveyor spring clips 61 will be at the entry end of the upper runs of the conveyors. When a pair of toothed binding strips S are fed into the machine, the rollers 203 drive them in until their leading ends are locked in the clips as shown in Figs. 11 to 13 and 20. At the same time the leading ends of the strip flanges S1 raise the arms 214 and thus close the contacts 213. Current now flows in an electrical circuit I which includes, in series between a positive supply terminal marked + and a negative earth connection, the two pairs of contacts 213, the solenoid 57 and the contacts 222. Since the beams are fully raised, the contacts 222, which operate as a safety interlock, will be closed, and the solenoid 57 therefore becomes energized, raising the strut 54 clear of the key lever 48 of the clutch C1. The clutch key part 46 (Figs. 17 and 19) is now rocked by the spring 50 into engagement with one of the keyways 41 on the clutch driving part 40. The driven part is thereby locked to the driving part and the conveyors are set in motion and draw the strips under the beams. As the trailing ends of the strips pass beyond the arms 214, these arms drop and open the contacts 213. The conveyor drive shaft 38 is caused to make exactly four revolutions by the action of the cam 53. When the conveyors begin to move, the cam 53 maintains the strut 54 clear of the path of the clutch key lever 48 for three complete revolutions, and during the fourth revolution, when the solenoid 57 is de-energized, the projection 54' drops into the cam recess 53' allowing the strut 54 to engage the key lever 48 and thereby arrest the conveyors at the point where the spring clips 61 have completed exactly one-half of the circuit represented by the path of the conveyor chains. Meanwhile as the spring clips 61 have passed over the tripping pins 67, they have opened automatically and released the strips just before the leading ends of their flanges abutted against the bevelled edges 194 of the stop bolts 190, as shown in Figs. 14 and 15. The position of the strips and conveyors is now as shown in Fig. 4.

It is preferable to provide a continuously acting brake (not shown) on the conveyor sprocket shaft 38 to resist any tendency of the conveyors to rebound when the clutch C1 is disengaged, and there may be provided, in two or more blocks in each conveyor, and in the strip guide members 193 and 193a (or 192 and 192a) spring-loaded plungers (not shown) having rounded heads which are adapted to bear on the strips and thereby ensure that they will come to rest in substantially the desired positions.

The return of the strut 54 to the position shown in Fig. 20 closes the contacts 212 just before the contacts 211 are opened by the cam 210. Current thus flows momentarily in a circuit II which includes in series the contacts 211, the contacts 212 and the solenoid 156. The solenoid 156 engages the table-drive clutch C2 and the excentric 150 is consequently set in motion, rocking the shaft 136 to raise the table. The clutch C2 is disengaged by the strut 154 after exactly one revolution, and the table is left in the position shown in Fig. 2, being held up by the brake 140, 141.

This rotation of the table drive shaft 157 causes the cam 215 momentarily to close the contacts 216 and thus complete a circuit III, which includes in series with these contacts the solenoid 124 that controls the panel feed clutch C3. This clutch thereupon engages and is tripped out of engagement after the shaft 118 has made one complete revolution. The crank mechanism 117, 116, 115 (Fig. 2) causes the shaft 114 to oscillate through about 150 degrees and the chain gearing 113, 112 causes the shaft 111 to make an oscillation of about 450 degrees, so that the panel feed plate 100 first moves inward, raising the pawls 128, and pushes the bottom panel P of each stack through the gap 104 and on to the surface of the table 130, 130a, until the leading edges of these panels abut against the guide member 193a. The plate 100 now returns, slipping under the stacks of panels, which are prevented from moving back by the pawls 128. The plate 100 raises the pawls slightly, passes under them, and comes to rest in its original position. The relative positions of the set of panels P and strips S after this operation are as shown in Figs. 2, 4, 14 and 15.

Shortly before the shaft 118 comes to rest, the cam 217 thereon momentarily closes the contacts 218 which cause current to flow in a circuit IV including the solenoid 92 in series with these contacts. This solenoid thereupon raises the strut 90 and thus engages the beam drive clutch C4, the driven shaft 83 of which makes exactly one revolution. The beams 70 and 70a now descend in unison. Since the strip-stop bolts 190 are engaged by means of their bevelled edges 194 with the leading ends of the strip flanges, as shown in Figs. 14 and 15, these bolts do not at first descend with the beams. The levers 196 are moved by the springs 200 so as to engage the notches 198 under the lugs 195 of the bolts. The under surface of the beams then engages the abutments 202 on the bolts and forces these downwards, as shown in Figs. 16 and 21 into the apertures 201 in the blocks 60', the bevelled edges 194 of the bolts forcing the strips S a short distance backwards into an exactly predetermined position. As the beams continue to descend, they force the panels down until they are penetrated by the strip teeth S2, the thrust due to the beams being transmitted through the blank, the blocks 60 and 60', and the chains 35 to the flanges 34 of the frame members. The table 130, 130a meanwhile is forced down by the action of the beams, the brake 140, 141 slipping and the collar 147 (Fig. 9) moving to the other end of the aperture 148. As the beams rise again, the stop bolts 190 are supported by the levers 196 and raised until their feet are above the top edge of the strip flanges S1.

When the pair of strips for the next box blank are fed in and cause the conveyors to operate again, the partly finished blank is discharged from under the beams and fed between the rollers 182, 183, which, owing to the spring-loaded bearings 185, accommodate the gap between them to any variation that may exist in the thickness of the panels. The panels are thus forced into close contact with the main portions of the strips throughout the length of the latter, the circumferential grooves formed in the treads of the upper rolling-in rollers 183 permitting the strip teeth to penetrate the panels freely so that the desired close contact is assured. As the blank leaves the rollers 182, 183, it enters the rollers 180, 181 which clench over the ends of the strip teeth that project above the panels.

When the box blank moves out from under the beams, the leading panel engages the lower arm 199, of the levers 196 and rocks these levers so as to allow the stop bolts to fall. The bolts then ride along the upper edge of the strip flanges S1 and drop behind them ready to arrest the next pair of strips.

I claim:

1. The method of assembling a folding box-blank of the kind comprising a plurality of panels connected together by toothed binding strips, which method comprises the steps of bringing a set of panels for one box blank into register with a pair of the toothed strips, forcing the panels so registered and while stationary into preliminary engagement with the strip teeth by means of a pressing operation by which all the teeth intended to be driven into any one panel edge are driven simultaneously, thereafter passing the blank thus partly assembled between loaded rollers, one of which bears on the panels near to but not in the immediate neighborhood of the strip teeth so as to drive the strip teeth fully home into the panels, and finally clenching the ends of the strip teeth that project above the panels.

2. The method of assembling a folding box-blank of the kind comprising a plurality of panels connected together by toothed binding strips, which method comprises the steps of feeding a pair of said strips into a press in the direction of their length, feeding from a supply of panels previously cut to size a set of panels for one box blank in a direction at right angles to said direction of feeding the strips, so as to bring said strips and panels into predetermined register, forcing the panels so registered and while stationary into preliminary engagement with the strip teeth by means of a pressing operation by which all the teeth intended to be driven into at least any one panel edge are driven simultaneously, thereafter passing the blank thus partly assembled between loaded rollers, which leave the parts of the panels immediately surrounding the strip teeth untouched so that the strip teeth can freely penetrate the panels, and finally clenching over the points of the teeth.

3. Apparatus for assembling a folding box-blank of the kind comprising a plurality of panels connected together by toothed binding strips, said apparatus comprising feeding mechanism serving to bring a set of panels for one box blank into predetermined register with a pair of the toothed strips, a press capable of forcing the panels so registered into preliminary engagement with the strip teeth by driving simultaneously all the teeth intended to be driven into at least any one panel edge, a loaded roller positioned to bear on the surface of the panels, on the side opposite to that into which the strip teeth are driven, as the partly finished blank is ejected from said press, said roller being interrupted in way of the points of said teeth so as to permit them to be rolled fully home through the panels, and tooth-clenching means positioned to operate on the teeth after they have passed the rolling-in station.

4. Apparatus for assembling a folding box-blank of the kind comprising a plurality of panels connected together by toothed binding strips and adapted to press all the panels for one box blank simultaneously on to a strip, said apparatus comprising a press beam, a chain conveyor which serves for feeding separate lengths of toothed strip into a predetermined position under said press beam, and which is provided with a clip adapted to engage one end of the strip, and a frame including a guideway disposed beneath said beam, links of said chain conveyor comprising bearing blocks and being slidable on said guideway, whereby said links are adapted to transmit to said frame the force due to the closing of said press beam on to a box blank.

5. Apparatus for assembling a folding box-blank of the kind comprising a plurality of panels connected together by toothed binding strips and adapted to press all the panels for one box blank simultaneously on to a strip, said apparatus comprising a press beam, a frame including a guideway disposed beneath and parallel to said beam, an endless conveyor comprising blocks which are articulated together and which are slidable on said guideway, a clip mounted on said conveyor and adapted to engage the leading end of a separate length of toothed binding strip and thereby draw said strip under said beam, means for arresting said strip in a predetermined position under said beam, and means for arresting said conveyor automatically when said clip is at the entry end of the portion thereof that is supported by said guideway.

6. Apparatus for assembling a folding box-blank of the kind comprising a plurality of panels connected together by toothed binding strips and adapted to press all the panels for one box blank simultaneously on to a strip, said apparatus comprising a press beam, a frame including a guideway disposed beneath and parallel to said beam, an endless chain which includes rollers running along said guideway and links comprising blocks facing said press beam, a clip mounted on said chain and adapted to engage one end of a separate length of toothed strip and feed said strip under said beam, and means for feeding panels into predetermined register with said strip, the force due to the closing of the press on to the box blank being transmitted to said guideway through said blocks and thence through said rollers.

7. Apparatus for assembling a folding box-blank of the kind comprising a plurality of panels connected together by toothed binding strips and adapted to press all the panels for one box blank simultaneously on to a strip, said apparatus comprising a press beam, a frame member beneath and parallel to said beam, a conveyor running on said frame member and comprising a clip adapted to engage the leading end of a separate length of toothed binding strip and thereby draw said strip under said beam, a stop movable into such a position that, while lying out of the path of said clip, said stop is capable of engaging the leading end of said strip as said strip attains substantially a predetermined position, and a tripping member co-operating with said clip to cause it to release said strip as said clip passes said stop.

8. Apparatus for assembling a folding box-blank of the kind comprising a plurality of panels connected together by toothed binding strips and adapted to press all the panels for one box blank simultaneously on to a strip, said apparatus comprising a press beam, a frame member beneath and parallel to said beam, a conveyor running on said frame member and comprising a clip adapted to engage the leading end of a separate length of toothed binding strip and thereby draw said strip under said beam, a stop movable into such a position that, while lying out of the path of said clip, said stop is capable of engaging the leading end of said strip as said strip attains substantially a predetermined position, a tripping member co-operating with said clip to cause it to release said strip as said clip passes said stop, and means for moving said stop into one position for arresting said strip and thereafter for imparting to said stop a further movement which serves to displace said strip, in a direction opposite to the direction in which it was fed, into an exactly predetermined position.

9. Apparatus for assembling a folding box-blank of the kind comprising a plurality of panels connected together by toothed binding strips and adapted to press all the panels for one box blank simultaneously on to a strip, said apparatus comprising a press beam, a frame member beneath and parallel to said beam, a conveyor running on said frame member and comprising a clip adapted to engage the leading end of a separate length of toothed binding strip and thereby draw said strip under said beam, a stop slidably mounted in said press beam so as to be movable in the same direction as, but independently of, said beam, into a position such that, while lying out of the path of said clip, said stop is capable of engaging the leading end of said strip as said strip attains substantially a predetermined position, a catch for holding said stop in such a position relative to said beam that said stop is inoperative when said beam is raised, and a tripping member cooperating with said clip to cause it to release said strip as said clip passes said stop.

10. Apparatus for assembling a folding box-blank of the kind comprising a plurality of panels connected together by toothed binding strips and adapted to press all the panels for one box blank simultaneously on to a strip, said apparatus comprising a press beam, a frame member beneath and parallel to said beam, a conveyor running on said frame member and comprising a clip adapted to engage the leading end of a separate length of toothed binding strip and thereby draw said strip under said beam, a stop slidably mounted in said press beam so as to be movable in the same direction as, but independently of, said beam, into a position such that, while lying out of the path of said clip, said stop is capable of engaging the leading end of said strip as said strip attains substantially a predetermined position, a catch for holding said stop in such a position relative to said beam that said stop is inoperative when said beam is raised, and a tripping member co-operating with said clip to cause it to release said strip as said clip passes said stop, said catch comprising a releasing member disposed in the path of a box-blank being ejected from said press, said releasing member, when engaged by a box-blank, permitting said stop to move into position to engage a following toothed strip.

11. Apparatus for assembling a folding box-blank of the kind comprising a plurality of panels connected together by toothed binding strips having a flange at one edge of the toothed main portion thereof, said apparatus comprising a press beam, a frame member beneath and parallel to said press beam, a conveyor comprising a clip capable of engaging the leading end of the toothed main portion of a binding strip and drawing said strip in a direction parallel to said beam into a position between said beam and said frame member, a stop slidably mounted in said beam, so as to be movable in the same direction as, but independently of, said beam, into a position such that said stop is capable of engaging the leading end of the flange of said strip, as said strip attains substantially a predetermined position, the portion of said stop that abuts against said strip flange being bevelled, and said stop having an abutment engaged by said beam as the press closes, whereby said stop is displaced to cause said bevelled portion thereof to move said strip in a direction opposite to its direction of feeding, and a catch for locking said stop to said beam during the opening of the press.

12. Apparatus for assembling a folding box-blank of the kind comprising a plurality of panels connected together by toothed binding strips and adapted to press all the panels for one box blank simultaneously on to a strip, said apparatus comprising a press beam, means for feeding a length of toothed strip in a direction parallel to said beam into a predetermined position under said beam, a row of hoppers having a common floor and serving to contain stacks of box panels, said row being disposed parallel and adjacent to said beam, a panel-engaging member slidable on said floor, an oscillating chain conveyor disposed below said floor, and a lug passing through said floor and connecting said conveyor to said panel-engaging member which is thereby caused to reciprocate normally to said beam and to deliver a panel from each of said hoppers simultaneously into a predetermined position under said beam.

13. Apparatus for assembling a folding box-blank of the kind comprising a plurality of panels connected together by toothed binding strips, said apparatus comprising feeding mechanism serving to bring a set of panels for one box blank into predetermined register with a pair of the toothed strips, a press capable of forcing the panels so registered into preliminary engagement with the strip teeth by driving simultaneously all the teeth intended to be driven into at least any one panel edge, and an electro-magnetic control device associated with said press beam and serving, when energized, to cause said press beam to execute only one complete pressing cycle at a time, said control device being associated with electrical contacts actuated by said panel-feeding and strip-feeding mechanism in such a manner that the completion of the feeding operations causes said press beam to operate.

14. Apparatus for assembling a folding box-blank of the kind comprising a plurality of panels connected together by toothed binding strips and adapted to press all the panels for one box blank simultaneously on to a strip, said apparatus comprising a press beam, an electro-magnetic control device serving, when energized, to cause said press beam to execute only one pressing cycle, a row of hoppers which serve to contain stacks of box panels, said row being disposed parallel to said beam, panel-feeding mechanism for simultaneously delivering a complete set of panels for one box blank transversely to said beam into a predetermined position thereunder, an electro-magnetic control device serving, when energized, to cause said panel-feeding mechanism to execute only one feeding cycle, intermittently-acting means comprising a clip adapted when at rest to engage one end of a separate length of toothed strip and when in motion to draw said strip under said beam in a direction parallel to said beam, an electro-magnetic control device serving, when energized, to cause said strip-feeding clip to traverse the length of said beam, means for arresting said strip in a predetermined position under said beam, an electrical contactor associated with said strip-feeding control device and so positioned as to be actuated, by the entry of a toothed strip into said clip, and thereby to energize said strip-feeding control device, and electrical contactors, responsive to the operation of said strip-feeding means for energizing said panel-feeding control device and thereafter said press beam control device.

15. Apparatus for assembling a folding box-blank of the kind comprising a plurality of panels connected together by toothed binding strips and adapted to press all the panels for one box blank simultaneously on to a strip, said apparatus comprising a press beam, an endless chain conveyor the upper run of which runs parallel with and beneath said beam, which serves for feeding separate lengths of toothed strip into a predetermined position under said press beam, and which is provided with a plurality of strip-engaging clips, spaced apart at equal intervals, said apparatus also comprising a driving member, a positive clutch connected between said conveyor and said driving member, and control mechanism which serves to disengage said clutch and arrest said conveyor whenever any of said clips arrives at the entry end of said upper run.

16. Apparatus for assembling a folding box-blank of the kind comprising a plurality of panels connected together by toothed binding strips and adapted to press all the panels for one box blank simultaneously on to a strip, said apparatus comprising a pair of press beams disposed parallel to one another, an electro-magnetic control device serving, when energized, to cause said beams each to execute only one pressing cycle, a pair of endless chain conveyors the upper runs of which are parallel with and respectively beneath said beams, each of said conveyors being provided with a plurality of strip-engaging clips spaced apart around the conveyor at equal intervals, and the said clips on one of said conveyors being level in a transverse direction with the said clips on the other of said conveyors, a shaft actuating said conveyors in unison, a driving member, a positive clutch connected between said shaft and said driving member, electro-magnetic control means which serve when energized to engage said clutch, means for disengaging said clutch automatically whenever two clips on said conveyors respectively arrive at the entry ends of said upper runs, two electrical contactors so positioned as to be actuated respectively by the engagement of two toothed strips with two of said clips when positioned at said entry end, an electrical circuit including said contactors and said control means for engaging said clutch upon actuation of both of said contactors, and means responsive to rotation of said shaft for energizing said beam-control device.

17. Apparatus for assembling a folding box-blank of the kind comprising a plurality of panels connected together by toothed binding strips and adapted to press all the panels for one box blank simultaneously on to a strip, said apparatus comprising a press beam, an endless chain conveyor the upper run of which runs parallel with and beneath said beam, which serves for feeding separate lengths of toothed strip into a predetermined position under said press beam, and which is provided with a plurality of strip-engaging clips, spaced apart at equal intervals, said apparatus also comprising a driving member, a positive clutch connected between said conveyor and said driving member, control mechanism which serves to disengage said clutch and arrest said conveyor whenever any of said clips arrives at the entry end of said upper run, an electro-magnetic control device for engaging said clutch, and an electrical interlocking device which is associated with said press beam and electrically connected with said control device to prevent engagement of said clutch unless said beam is raised.

18. In apparatus for assembling folding box-blanks, a plurality of intermittently movable elements serving to effect respectively distinct assembling steps, a plurality of rotary clutches having driven members operatively connected with said elements respectively, a plurality of tripping members co-operating with said clutches respectively for engaging and disengaging them and arresting their driven elements at particular angular dispositions, a plurality of electro-magnetic control devices for actuating said tripping members respectively, contactors actuating in response to movement of said tripping members, and electrical circuits each including the one of said contactors that is associated with one of said tripping members and a control device associated with another of said tripping members, whereby said clutches are caused to operate in succession.

19. Apparatus for assembling a folding box-blank of the kind comprising a plurality of panels connected together by toothed binding strips and adapted to press all the panels for one box blank simultaneously on to a strip, said apparatus comprising a press beam, an intermittently-acting chain conveyor which serves for feeding separate lengths of toothed strip into a predetermined position under said press beam, and which is provided with a clip adapted to engage one end of the strip, means for feeding only one complete set of panels for a box blank at a time in a direction transversely to said beam into a predetermined position under said beam, a movable table for supporting a set of panels clear of a toothed strip when the panels and strip are in predetermined register under said beam, means for raising said table, means for causing said press to execute only one complete pressing cycle at a time, and electro-magnetic control mechanism serving, in response to the entry of a toothed strip into said clip, automatically to cause said conveyor to effect the feeding of a toothed strip under said beam and the discharge from under said beam of a previously pressed blank, then the raising of said table, thereafter the feeding of a set of panels, and finally the operation of the press, whereby the apparatus operates in distinct cycles each initiated by the supply of a toothed strip.

20. Apparatus for assembling a folding box-blank of the kind comprising a plurality of panels connected together by toothed binding strips, said apparatus comprising a press, a chain conveyor for feeding separate lengths of toothed strip into said press, a guideway for said conveyor, a strip-engaging clip on said conveyor comprising a fixed jaw and a moving jaw co-operating together to engage an end of the toothed strip, resilient means urging said moving jaw into its engaging position, a projection operatively connected with said moving jaw, and a tripping member fixed adjacent to said guideway in the path of said projection for disengaging said clip at a predetermined position along said guideway.

21. The method of assembling a folding box-blank of the kind comprising a plurality of panels connected together by toothed binding strips, which method comprises the steps of feeding a pair of said strips into a press in the direction of their length, thereafter displacing said strips through a short distance, in a direction opposed to their feeding direction, into an exactly predetermined position relative to said press, thereafter feeding a set of panels for one box blank in a direction at right angles to said direction of feeding the strips, so as to bring said strips and panels into predetermined register, forcing the panels so registered and while stationary into preliminary engagement with the strip teeth by means of a pressing operation by which all the teeth of said strips are driven simultaneously into the panel edges, thereafter driving the strip teeth fully home into the panels by passing the blank thus partly assembled between loaded rollers, and finally clenching over the points of the teeth.

22. Apparatus for assembling a folding box-blank of the kind comprising a plurality of panels connected together by toothed binding strips, said apparatus comprising a press, intermittently acting conveyor means comprising two clips adapted each to engage an end of a separate length of toothed strip and to feed said strips along parallel paths into said press, stops movable into the paths of said strips to locate them in said press, panel-feeding mechanism reciprocable transversely of the paths of said strips for feeding a complete set of panels for one box blank simultaneously into said press into a position such that their aligned edges are in predetermined register with said strips respectively, means responsive to operation of said conveyor and said panel-feeding mechanism to cause said press to execute one pressing operation, two pairs of rollers resiliently urged together and having the respective gaps between them so positioned as to lie in the paths of said strips on the ejection of the blank from said press, said rollers serving to drive the strip teeth fully home into the panels, and tooth-clenching rollers positioned on the side of said first-mentioned rollers remote from said press.

23. In a box-making machine, means for delivering panels successively to an assembly station, comprising a hopper having a floor and a front wall the lower edge of which is spaced from said floor by a gap, a plate slidable on said floor, an endless chain disposed beneath said floor and having its upper run normal to the plane of said wall, a lug passing through an aperture in said floor and connecting said plate to said chain, a sprocket engaging said chain, and driving mechanism for oscillating said sprocket and thereby causing said plate to reciprocate between the side of said floor remote from said gap and a position in which it projects through said gap.

24. In a box-making machine, means for delivering panels successively to an assembly station, comprising a hopper having a floor and a front wall the lower edge of which is spaced from said floor by a gap, a plate slidable on said floor, an endless chain disposed beneath said floor and having its upper run normal to the plane of said wall, a lug passing through an aperture in said floor and connecting said plate to said chain, a sprocket engaging said chain, a crank drivably connected to said sprocket, a member rotatable about an axis parallel to the axis of said crank and comprising a crank of shorter radius than said first-mentioned crank, and a connecting-rod coupling together the pins of said cranks, whereby rotation of said rotatable member causes said plate to reciprocate between the side of said floor remote from said gap and a position in which it projects through said gap.

HERMANN HANS JOHANNES KRUSE.